(12) United States Patent
Acimas et al.

(10) Patent No.: US 11,528,849 B2
(45) Date of Patent: Dec. 20, 2022

(54) TWINE KNOTTER ARRANGEMENT FOR KNOTTING TWINE AND BALING DEVICE

(71) Applicant: Rasspe Systemtechnik GmbH, Wermelskirchen (DE)

(72) Inventors: Andreas Acimas, Solingen (DE); Karsten Baldsiefen, Lindlar (DE)

(73) Assignee: Rasspe Systemtechnik GmbH, Wermelskirchen (DE)

(*) Notice: Subject to any disclaimer, the term of this patent is extended or adjusted under 35 U.S.C. 154(b) by 28 days.

(21) Appl. No.: 16/975,965

(22) PCT Filed: Mar. 21, 2019

(86) PCT No.: PCT/EP2019/057150
§ 371 (c)(1),
(2) Date: Aug. 26, 2020

(87) PCT Pub. No.: WO2019/180172
PCT Pub. Date: Sep. 26, 2019

(65) Prior Publication Data
US 2021/0000018 A1  Jan. 7, 2021

(30) Foreign Application Priority Data
Mar. 23, 2018 (DE) .......................... 202018101650.4

(51) Int. Cl.
*B65B 13/26* (2006.01)
*A01F 15/14* (2006.01)
*A01D 59/04* (2006.01)

(52) U.S. Cl.
CPC ............ *A01F 15/145* (2013.01); *A01D 59/04* (2013.01); *B65B 13/26* (2013.01)

(58) Field of Classification Search
CPC ......... B65B 13/18; B65B 13/24; B65B 13/26; B65B 27/12; A01F 15/14; A01F 15/145; A01D 59/04
(Continued)

(56) References Cited

U.S. PATENT DOCUMENTS 3,667,377 A * 6/1972 Persson .................. B65B 13/28
100/19 R
4,120,238 A * 10/1978 Schafer ................. A01F 15/146
100/11
(Continued)

FOREIGN PATENT DOCUMENTS

CN  203691996 U  7/2014
DE     2759976 C1  7/1982
(Continued)

OTHER PUBLICATIONS

Russian Office Action dated Apr. 5, 2021 in Russian Application No. 2020130264/10.
(Continued)

*Primary Examiner* — Jimmy T Nguyen
(74) *Attorney, Agent, or Firm* — Sughrue Mion, PLLC

(57) ABSTRACT

A twine knotter arrangement for knotting twine to tie a bale, the twine knotter arrangement including: a twine knotter (1), a deflection roller (41) adjustable relative to the twine knotter (1), via which twine (42, 43) coming from the bale is deflected in the direction of the twine knotter (1), and an adjusting device (54) for adjusting the position of the deflection roller (41) in dependence on the force ($F_R$) exerted by the twine (42, 43) on the deflection roller (41).

11 Claims, 18 Drawing Sheets

(58) Field of Classification Search
USPC .............................................. 100/19 R, 33 R
See application file for complete search history.

(56) References Cited

U.S. PATENT DOCUMENTS

| | | | | |
|---|---|---|---|---|
| 4,466,345 | A | * | 8/1984 | Kaldenbach ............ B65B 27/12 100/19 R |
| 5,783,816 | A | | 7/1998 | Mcpherson |
| 5,855,166 | A | | 1/1999 | Mcpherson |
| 6,199,475 | B1 | * | 3/2001 | Schwelling ............ B65B 13/28 100/11 |
| 2004/0182050 | A1 | * | 9/2004 | Pieri .................... B65B 11/045 53/556 |

FOREIGN PATENT DOCUMENTS

| | | | | |
|---|---|---|---|---|
| DE | 10011909 A1 | * | 9/2001 | ........... B65B 13/025 |
| EP | 2941951 A1 | | 11/2015 | |
| RU | 2 599 644 C2 | | 10/2016 | |
| WO | 2013/185832 A2 | | 12/2013 | |

OTHER PUBLICATIONS

International Search Report for PCT/EP2019/057150 dated Jun. 4, 2019 [PCT/ISA/210].

* cited by examiner

TWINE KNOTTER ARRANGEMENT FOR KNOTTING TWINE AND BALING DEVICE

CROSS REFERENCE TO RELATED APPLICATIONS

This application is a National Stage of International Application No. PCT/EP2019/057150 filed Mar. 21, 2019, claiming priority based on German Patent Application No. 20 2018 101 650.4 filed Mar. 23, 2018.

BACKGROUND OF THE INVENTION

Field of the Invention

The invention relates to a twine knotter arrangement for knotting twine to tie a bale. The twine knotter arrangement has a twine knotter and a deflection roller which deflects twine coming from the bale in the direction of the twine knotter.

Background

Such a twine knotter arrangement is known from WO 2013/185832 A2. There, a twine knotter is described having a knotter frame, an intermediate shaft, which is rotatably supported on the knotter frame around an axis of rotation and which has a shaft input for connecting the intermediate shaft to an output element of a knotter drive shaft, as well as at least one bill hook shaft, which is rotatably supported around a bill hook axis on the knotter frame which is drive-wise connected to the intermediate shaft and which carries a bill hook for forming a twine knot. Preferably, the twine knotter has two bill hook shafts, each with one bill hook, which are drive-connected to the intermediate shaft.

Twine knotters are mainly used in mobile big rectangular bale presses for straw, hay, silage and similar materials as well as in the recycling application, e.g. for bundling paper, textiles, thin metal sheets and the same. Binding or bundling equipment fitted with such twine knotters may also form part of packaging machinery for strapping packages, bales or bundles of other materials suitable for this purpose. In stationary or mobile big bale presses, the pressing material is filled into a baling channel, which is at least rectangular in cross-section, preferably pre-compressed and is pressed to a rectangular string of material. This is partitioned into box-shaped bales—conventionally is also the term square bales—which upper and lower side as well as outer sides are encompassed in longitudinal direction of the baling channel with several twine strands, which are knotted before expelling the bale.

The feeding of necessary twine, the knotting process within the twine knotter as well as the interaction of pressing elements involved in forming a double knot are described for common double knotters in DE 27 59 976 C1.

To form a knot, an upper twine strand and a lower twine strand are fed into a working area of a bill hook and placed on the bill hook. The bill hook is then turned so that the twine strands wrap around the bill hook and then a knot is formed by clamping the bill hook and pulling off the loop formed by the winding. During this winding process, especially if two parallel bill hook shafts and bill hooks are provided, increased tensile forces may occur, which are introduced into the twine strand by one or both bill hooks. These tensile forces may exceed the yield strength of the twine material used. This may then lead to the twine breaking.

The object of the present invention is therefore to provide a twine knotter arrangement and a baling device which avoids a tensile force in the twine material at which the yield strength of the twine material would be exceeded.

SUMMARY OF THE INVENTION

The object is solved by a twine knotter arrangement for knotting twine to tie a bale, which has a twine knotter and a deflection roller adjustable relative to the twine knotter, via which twine coming from the bale is deflected in the direction of the twine knotter. Furthermore, an adjusting device is provided for adjusting the position of the deflection roller depending on the force exerted by the twine on the deflection roller.

Due to the deflection of the twine strand by the deflection roller, a twine strand section leading to the deflection roller and a twine strand section leading away from the deflection roller are arranged at an angle to each other. A tensile force acting on the entire twine strand thus results in a radial force acting from the twine strand on the deflection roller. The adjusting device enables the deflection roller to be shifted depending on the force exerted by the twine on the deflection roller. As the wrap angle of the twine around the deflection roller becomes smaller as the deflection roller is displaced as the force increases, the tensile force within the twine strand is reduced. The adjusting device may have a spring element by which it is adjustable, or it may be hydraulically or pneumatically adjustable.

In one design, the twine knotter arrangement has a frame on which the deflection roller is guided in a translatory manner. The adjusting device can be hinged to the frame on one side and supported against the deflection roller on the other side. Furthermore, the adjusting device may be adjustable in length.

The deflection roller may be attached to a roller holder which is connected to the adjusting device.

To guide the deflection roller, the roller holder can have laterally projecting guide pins which are guided in guide grooves of the frame.

In an exemplary embodiment, the adjusting device may comprise a telescopic rod which is subjected to a force, for example by means of a spring element, to assume an extended position.

In one embodiment, the twine knotter of the twine knotter arrangement has a knotter frame, an intermediate shaft and at least one bill hook shaft. The intermediate shaft is mounted on the knotter frame so that it can rotate about a longitudinal axis and has a shaft input for connecting the intermediate shaft to an output element of a knotter drive shaft. The at least one bill hook shaft is mounted on the knotter frame so as to be rotatable about a bill hook axis, is drive-connected to the intermediate shaft and carries a bill hook for forming a knot.

The twine knotter can be designed as an independent unit, wherein the twine knotter can be detachably drive-wise connected via the shaft input of the intermediate shaft to the knotter drive shaft.

Two bill hook shafts may be provided, each of which is mounted on the knotter frame so that it can rotate about a bill hook axis and which are each drive-connected to the intermediate shaft.

Furthermore, the twine knotter arrangement may include a deflection device for deflecting twine strands, which is adjustably held on the knotter frame and driven by the intermediate shaft.

Furthermore, the object is solved by a baling device with a twine knotter arrangement described above, the baling device having a baling channel, into which bale material is pressed in a pressing direction to form a bale by means of a ram. The twine knotter is arranged to the side of the baling channel, with the deflection roller being arranged between the baling channel and the twine knotter, and with the deflection roller being adjustable at least substantially parallel to the pressing direction.

The deflection roller can be arranged in such a way that the twine is guided at least substantially in the pressing direction to the twine knotter.

BRIEF DESCRIPTION OF THE DRAWINGS

An exemplary embodiment of a twine knotter arrangement is explained in more detail below using the figures as examples. Wherein.

DETAILED DESCRIPTION OF THE INVENTION

Figure 1:
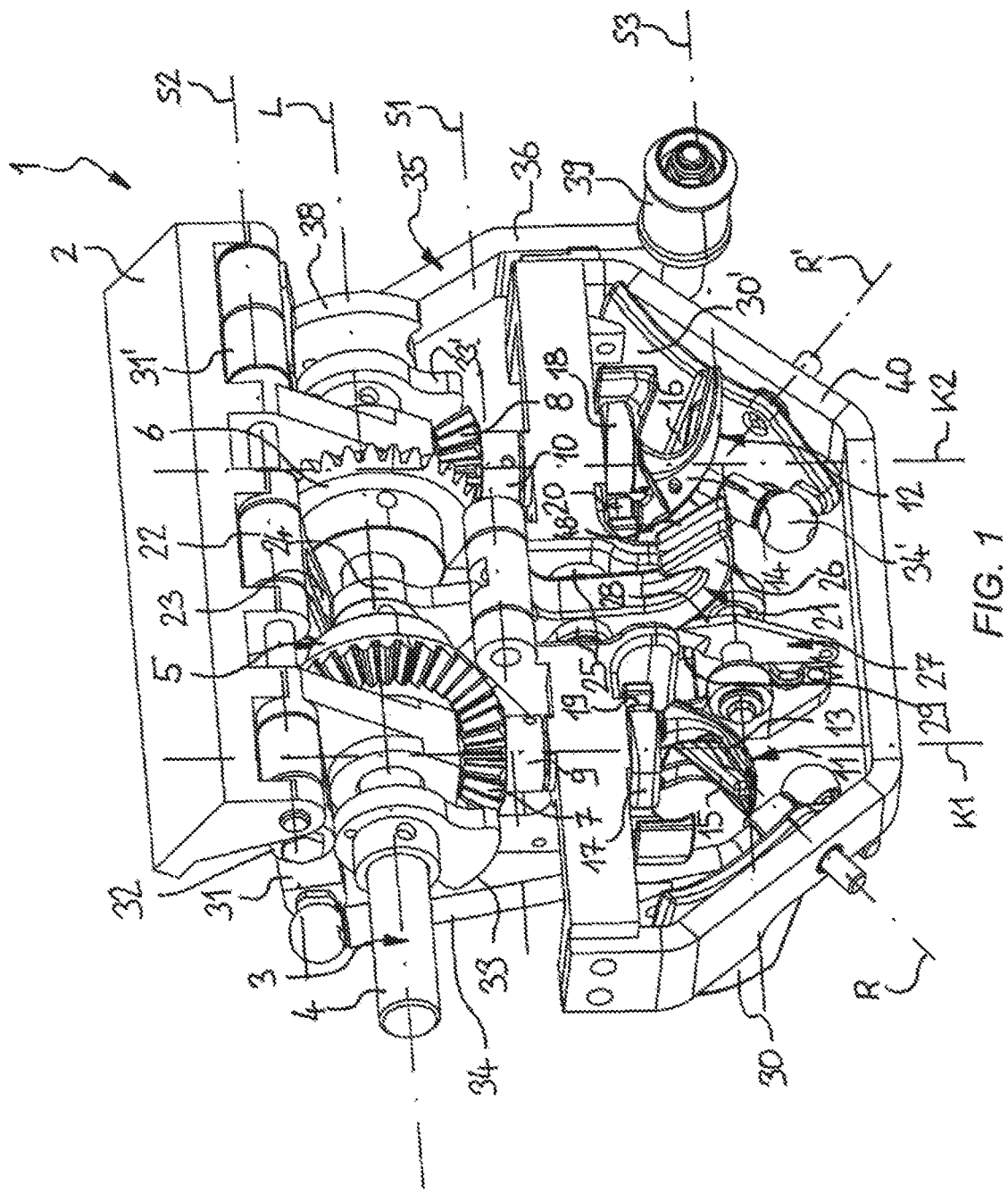
FIG. 1 shows a twine knotter in perspective view.

FIG. 1 shows a twine knotter 1 having a knotter frame 2, on which all functional components of the twine knotter are mounted, so that this forms an independent assembly unit. On the knotter frame 2, an intermediate shaft 3 is rotatably supported around a longitudinal axis L. The intermediate shaft 3 has a shaft input 4, with which the intermediate shaft 3 can drive-wise be connected to an output element of a knotter drive shaft. In the present case, the shaft input 4 is formed as a journal, which is connectible via an output element of an angle drive to the knotter drive shaft. On the intermediate shaft 3, a first input-bevel-gear 5 and a second input-bevel-gear 6 are non-rotationally attached. The two input-bevel-gears 5, 6 are mirror-invertedly arranged and formed to a symmetry plane, which is arranged at a right angle to the longitudinal axis L. This means, that the toothings of the two input-bevel-gears 5, 6 are facing away from each other. In principle, they can also face each other. The toothings of the input-bevel-gears 5, 6 extend uninterrupted around the circumference. The first input-bevel-gear 5 meshes with a first output-bevel-gear 7, which sits non-rotationally on a first bill hook shaft 9. The second input-bevel-gear 6 meshes with a second output-bevel-gear 8, which rests non-rotationally on a second bill hook shaft 10. The first bill hook shaft 9 is rotatably supported around a first bill hook axis K1 on the knotter frame 2. The second bill hook shaft 10 is rotatably supported around a second bill hook axis K2 on the knotter frame 2. The two bill hook axes K1, K2 are aligned parallel to each other and intersect the longitudinal axis L at a right angle. Also other arrangements might be taken into account, in which the bill hook axes K1, K2 cross the longitudinal axis at a distance thereto and if necessary are arranged not at a right angle to the longitudinal axis L. The bill hook axes K1, K2 do not compulsively have to be arranged parallel to each other.

The first bill hook shaft 9 has at its end a first bill hook 11 for forming a knot in a twine strand. This comprises a first hooked portion 13, which protrudes laterally from the first bill hook shaft 9. For this, a first bill hook tongue 15, which also projects laterally, is arranged movable in a generally known manner, to clamp a twine strand between the first hooked portion 13 and the first bill hook tongue 15. The second bill hook shaft 10 carries at its end identically to the first bill hook shaft 9, a second bill hook 12, having a laterally projecting second hooked portion 14 and a second bill hook tongue 16, movable relative thereto. The two bill hooks 11, 12 can be formed identically or preferably mirror-image symmetrically to the symmetry plane, which is arranged at a right angle to the longitudinal axis L. For driving the two bill hook tongues 15, 16 a first bill hook control cam 17 is provided, which is arranged stationary to the knotter frame 2 and has an outer circumferential face, which extends around the first bill hook axis K1. On the first bill hook control cam 17, the first bill hook tongue 15 is radially supported with a first knotter tongue roller 19 and spring-loaded against it. The first bill hook control cam 17 has a course around the first bill hook axis K1, which deviates from a circular path, so that during rotation of the first bill hook shaft 9, the first bill hook tongue 15 is opened and closed relative to the first hooked portion 13 in a known manner via a lever action.

Similarly, to control the second bill hook tongue 16, a second bill hook control cam 18 is provided, against which the second bill hook 16 is supported by a second bill hook roller 20. The two bill hook control cams 17, 18 are, in this case, also formed mirror-image symmetrically to the symmetry plane, which is arranged at a right angle to the longitudinal axis L.

By means of the mirror-image symmetrical arrangement of the two input-bevel-gears 5, 6, the two bill hook shafts 9, 10 are driven in opposite direction to each other. As the two bill hook control cams 17, 18 are also formed mirror symmetrically, the two bill hooks 11, 12 open at the same time.

Between the two bill hook shafts 9, 10, a reserve holder 21 is arranged, which is formed in the shape of a lever arm and is pivotably supported around a first pivot axis S1 on the knotter frame 2. The first pivot axis S1 is arranged parallel to the longitudinal axis L. For driving the reserve holder 21, a lever 22 is provided, which is pivotably supported around a second pivot axis S2 on the knotter frame 2, wherein the second pivot axis S2 is arranged in parallel to the longitudinal axis L. The lever 22 is supported via a control element in form of a roller 23 on a control cam 24, wherein the control cam 24 extends around the longitudinal axis L and rotates with the intermediate shaft 3. The control cam 24 has a course deviating from a circular path, so that according to FIG. 1, the lever 22 can be lifted and lowered. On the lever 22, a coupling rod 25 is pivotably mounted, which is pivotably mounted on the reserve holder 21, so that the movement of the lever 22 causes a movement of the reserve holder 21.

At a lower end, the reserve holder 21 has a hook portion 26, with which a twine strand is gripped and can be pulled in the orientation of the twine knotter 1 shown in FIG. 1 to the rear, to form a twine reserve for forming twine knots. The hook portion 26 is centrally slotted in a plane, which is arranged at a right angle to the first pivot axis S1. During the pivoting of the reserve holder 21 backwards, the hook portion 26 slips over a foldable knife 27. The knife 27 is pivotably mounted around a third pivot axis S3 on the knotter frame 2, wherein the third pivot axis S3 is arranged parallel to the longitudinal axis L. When moving the reserve holder 21 backwards from the starting positions shown in FIG. 1, a twine strand, which is pulled backwards by the reserve holder 21, abuts a back 28 of the knife 27, wherein the back 28 of the knife is facing away from the cutting edge 29 of the knife. The knife 27 is displaced from the starting position shown in FIG. 1 to a folded back position, till the twine strand has passed the knife 27. After this, the knife 27 is pivoted back in a spring loaded manner into the starting position shown in FIG. 1. During the moving of the reserve holder 21 backwards into its starting position, the twine strand abuts the cutting edge 29 of the knife 27 and is cut.

On the knotter frame 2, additionally two twine fingers 30, 30' are provided, wherein in the following the twine finger 30 is exemplary described for the first bill hook 11. The twine finger 30' for the second bill hook 12 is designed correspondingly. The twine finger 30 is pivotably mounted around a twine finger axis R on the knotter frame 2. The twine finger axis R is arranged at an angle to the first bill hook axis K1, wherein the angle deviates from a right angle. The twine finger 30 serves, as in the twine knotters according to the state of the art, for pressing a twine strand against the first bill hook 11, to be able to form a knot. The twine finger 30 is pivoted during the forming of the knot against the twine strand. For driving the twine finger 30, a further lever 31 is provided, which is pivotably supported around the second pivot axis S2 on the knotter frame 2. The lever 31 is supported via a control element in form of a roller 32 against a control cam 33, wherein the control cam 33 is non-rotationally arranged on the intermediate shaft 3 and has a course, which deviates from a circular path, so that the lever 31 is moved during a rotation of the intermediate shaft 3. On the lever 31, a coupling rod 34 is pivotably mounted, which is also pivotably mounted on the twine finger 30, so that the movement of the lever 31 is transferred onto the twine finger 30.

Furthermore, a deflecting device 35 is provided. This comprises a pivot arm 36, which is pivotably mounted around the second pivot axis S2 on the knotter frame 3. The pivot arm 36 is supported via a control element in form of a roller 37 on a control cam 38 of the intermediate shaft 3. The control cam 38 has also a course, which deviates from a circular path, so that when rotating the intermediate shaft 3, the pivot arm 36 is pivoted around the second pivot axis S2. A deflection roller 39 is rotatably mounted on a forward section of the pivot arm 36, with the aid of which a twine strand, as described later, can be directed. By means of the pivotable arrangement of the pivot arm 36 the deflection roller 39 can be pivoted into or out of the area of a twine strand.

The twine knotter 1 has downwardly a bracket 40, which is part of the knotter frame 2. On the bracket 40, the twine fingers 30, 30' are pivotably mounted. The bracket 40 also serves as attachment element of the whole twine knotter 1 on a press and has also the function of a protection bracket for the bill hooks 11, 12.

The twine knotter 1 is, thus, formed with its knotter frame 2 as a separate assembly unit, wherein all functional components of the twine knotter 1 are mounted or supported on the knotter frame 2. Especially the bearing of the twine fingers 30, 30' on the knotter frame 2 represent a design, which establishes the synchronization of the twine fingers 30, 30' for the knotter operation steps in an especially simple manner. The whole twine knotter 1 can be mounted via the knotter frame 2 on a press, wherein the shaft input 4 of the intermediate shaft 3 can be connected to a knotter drive shaft of a press. On the knotter drive shaft of the press itself and also on the press or its frame, no further functional components of the twine knotter exist, so that during a defect of the whole twine knotter 1 it can be dismantled as a unit, without influencing further present twine knotters on the same press or twine knotter, which are driven by the same knotter drive shaft. An additional dismantling of the other twine knotters is not necessary.

In the following the general process of binding two knots is described by using FIGS. 2 to 8, wherein for simplification only the twine knotter is represented with twine strands. The further components are initially not shown for simplification.

Generally, the twine knotter 1, shown in FIGS. 2 to 8 and corresponding to the twine knotter of FIG. 1, is arranged on a press, e.g. a bale press for the agricultural sector, as this is e.g. also shown in WO 2011/054360 A1. The twine knotter 1 is aligned in such a way that the longitudinal axis L is aligned in the direction of travel (F), whereby a deflection roller 41 deflects the twine coming from the bale to the twine knotter.

Figure 2:
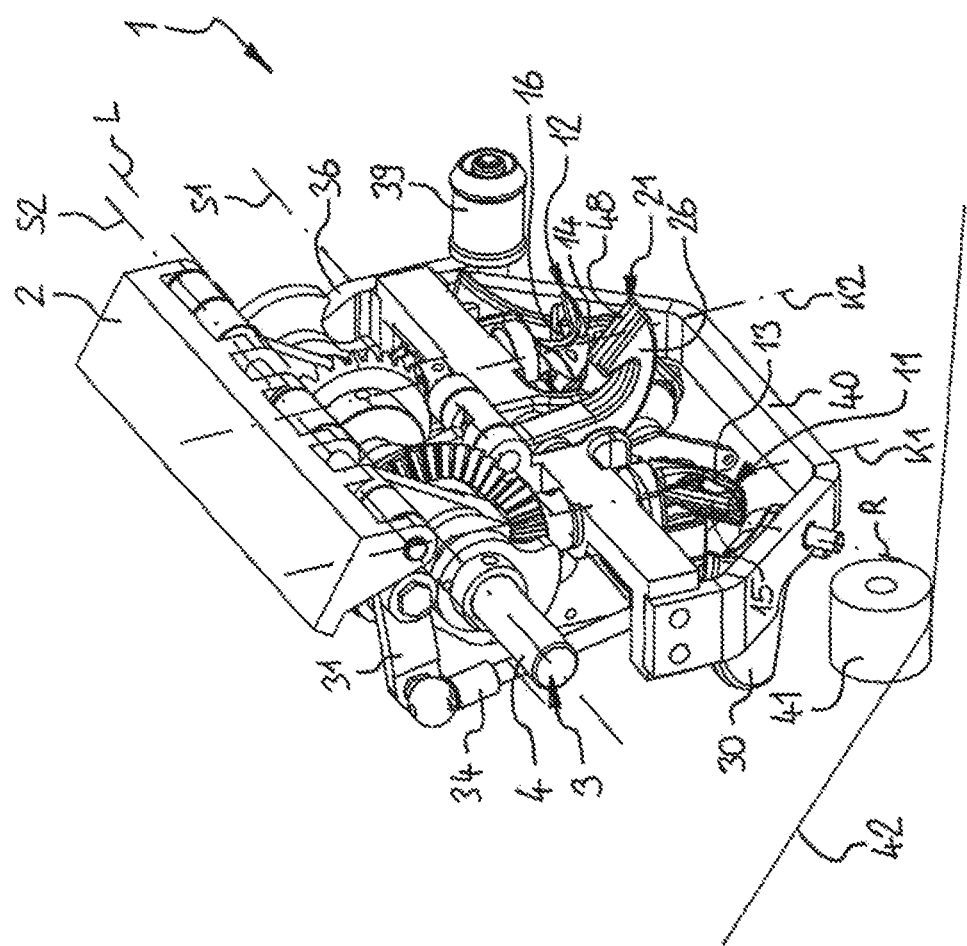
FIGS. 2-8 show the twine knotter of FIG. 1 in perspective views and in different positions of the individual components for illustrating a binding process.

Before binding knots, the bill hooks 11, 12 are arranged in the starting position shown in FIG. 2. The bill hook tongues 15, 16 are in a closed position. The bill hooks 11, 12 face, concerning the already above mentioned symmetry plane, which is arranged at a right angle to the longitudinal axis L, laterally away from each other, i.e. the first bill hook 11 faces in direction to the twine deflection (redirection) roller 41 and the second bill hook 12 faces in direction to the deflection (redirection) roller 39. The deflection roller 39 is pivoted by means of the pivot arm 36 into a front position into the area of the twine strand guide. Also the reserve holder 21 is pivoted into a front position, in which the hook portion 26 of the reserve holder 21 is also arranged in the guide area of the twine strands. In this connection "pivoted forward" means, that the components, i.e. the deflection roller 39 and the hook portion 26 of the reserve holder 21 are pivoted to the right side in the illustration of FIG. 2.

An upper twine strand 42 is, as shown in the illustration of FIG. 2, guided from a twine roll, not shown here, via known, also not shown tensioning- and decelerating devices coming from the top left around the twine deflection roller to the bottom right to an upper side of a bale.

Figure 3:
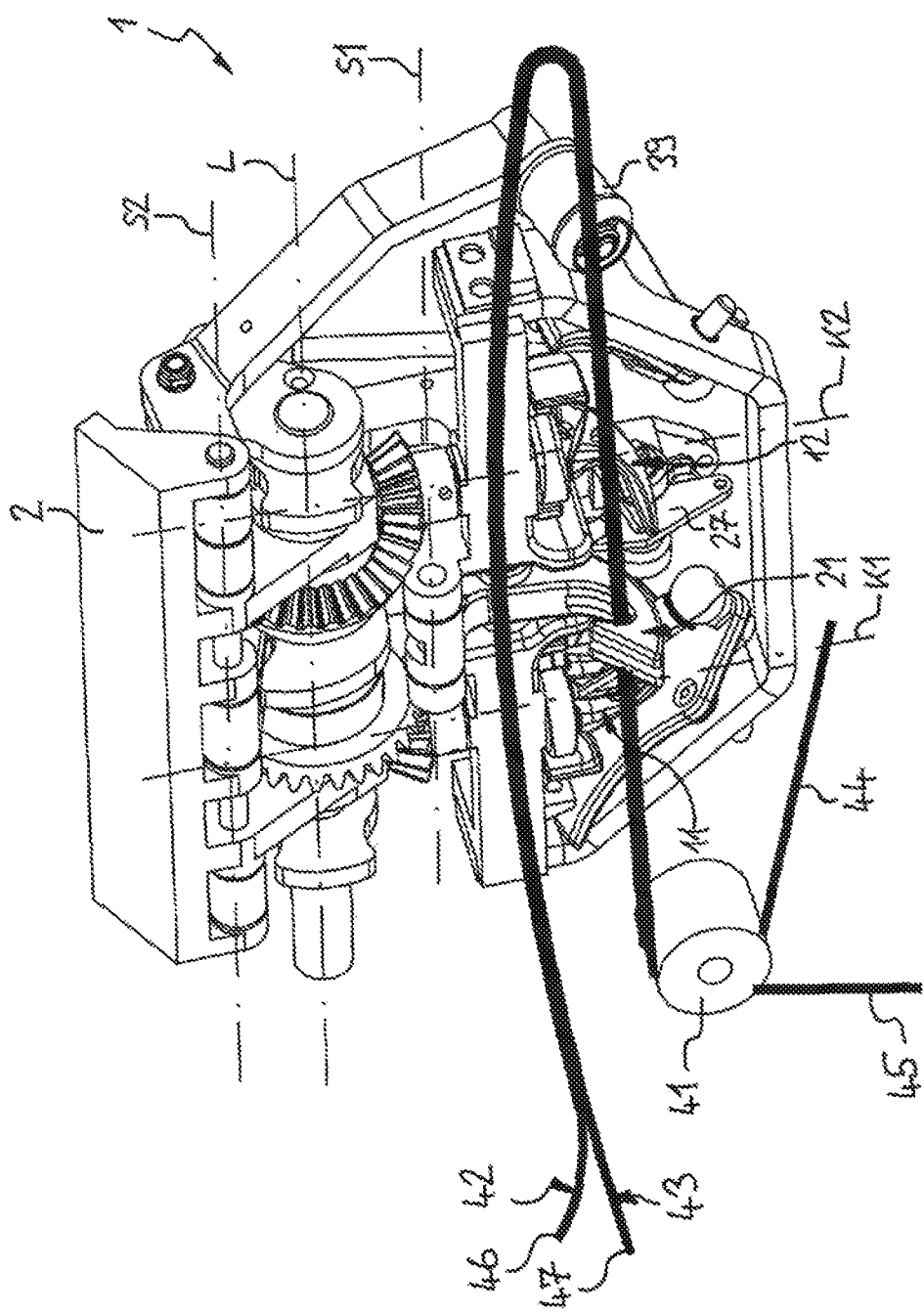

In a first method step, after activating the binding process, a baler needle, as shown later, is started to move, which baler needle moves a lower twine strand 43 upwards. The lower twine strand 43 extends from a lower twine roll via not shown known tensioning- and decelerating devices to a lower side of the bale. During the upward movement of the baler needle, it engages the upper twine strand 42 and transfers both twine strands 42, 43 together into the knotter area. The baler needle moves in this area against the driving direction and passes initially the twine deflection roller 41, then the first bill hook 11, then the hook portion 26 of the reserve holder 21, then the second bill hook 12 and finally the deflection roller 39. After this, the two twine strands 42, 43 are arranged with their ends 44, 45 leading to the bale around the twine deflection roller 41 and are arranged on the bill hook tongues 15, 16 of the bill hooks 11, 12, as well as on the hook portion 26 of the reserve holder 21. The twine fingers 30, 30' are arranged still in their starting position outside of the guide area of the twine strands 42, 43. The deflection roller 39 was pivoted backwards by means of the pivot arm 36 out of the guide area of the twine strands 42, 43, so that the twine strands 42, 43 do not rest on the deflection roller 39. The bill hook shafts 9, 10 were rotated up to a position, in which the bill hooks 11, 12 face each other and project into the guide area of the twine strands 42, 43. In the course of this, the first bill hook 11 is, when seen from above, rotated clockwise and the second bill hook 12 is, when seen from above, rotated anti-clockwise (FIG. 3).

Figure 4:
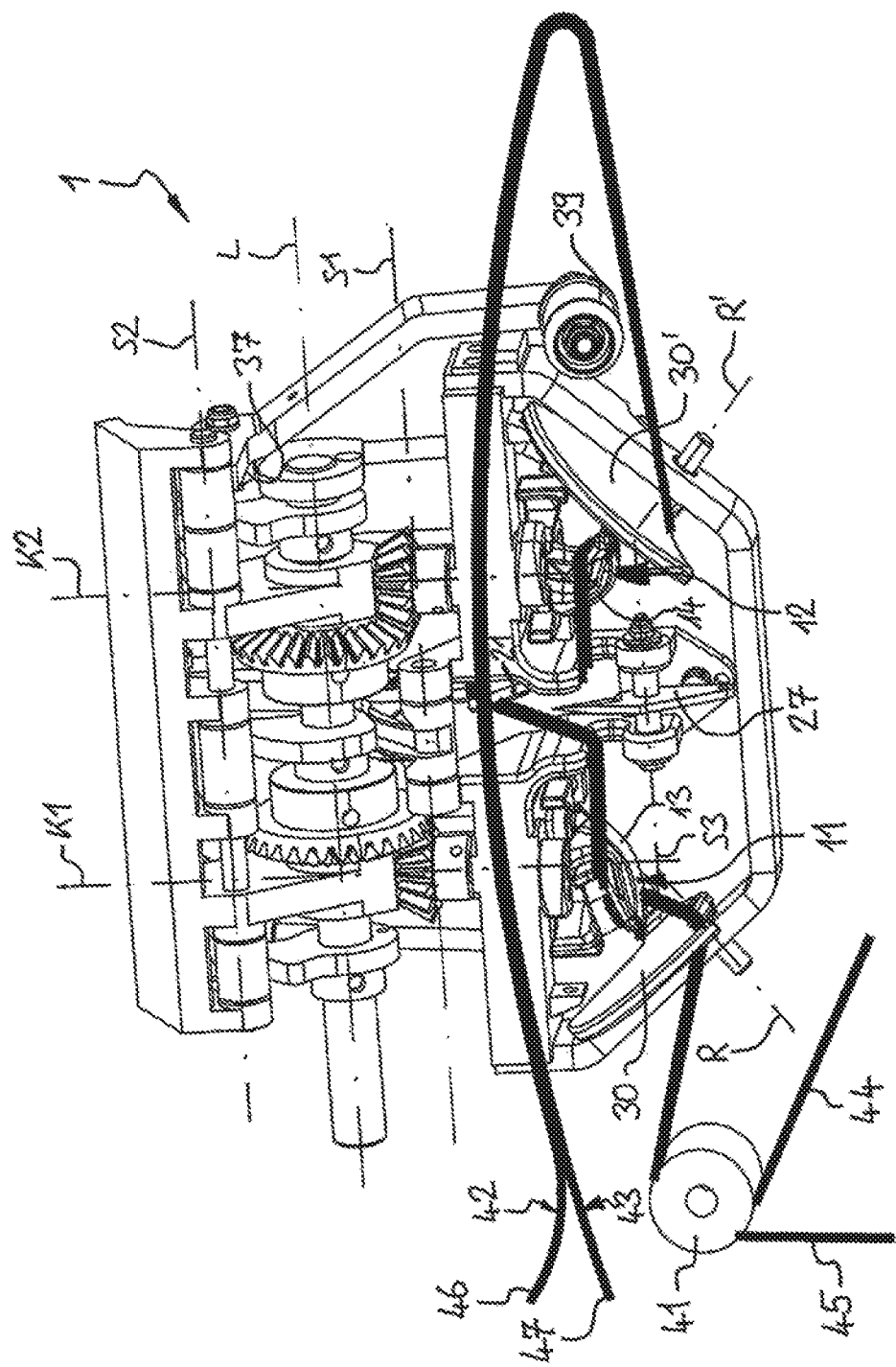

FIG. 4 shows the twine knotter 1, when the baler needle has nearly reached its uppermost position. The twine fingers 30, 30' are pivoted into the guide area of the twine strands 42, 43 and push the twine strands downwards, so that they are held on the bill hooks 11, 12. Here the twine strands 42, 43 are pressed down outside the pivot range of the hooked portions 13, 14 of the bill hooks 11, 12 in order to ensure secure engagement of the twine strands 42, 43 by the bill hooks 11, 12 during further rotation of the same. Furthermore, the reserve holder 21 is pivoted backwards into a retracted position and has pulled a twine reserve between the two bill hooks 11, 12. The twine strands 42, 43 held on the reserve holder 21 were pulled in over the knife 27 swerving against the spring force, as described above. In the gap formed between the twine finger 30' at the second bill hook 12 and the baler needle tip, the deflection roller 39 is pivoted into a forward position until the position according to FIG. 4 is reached. Furthermore, the bill hooks 11, 12 are further rotated in the same rotational sense as described above and are arranged again approximately in the starting position.

Figure 5:
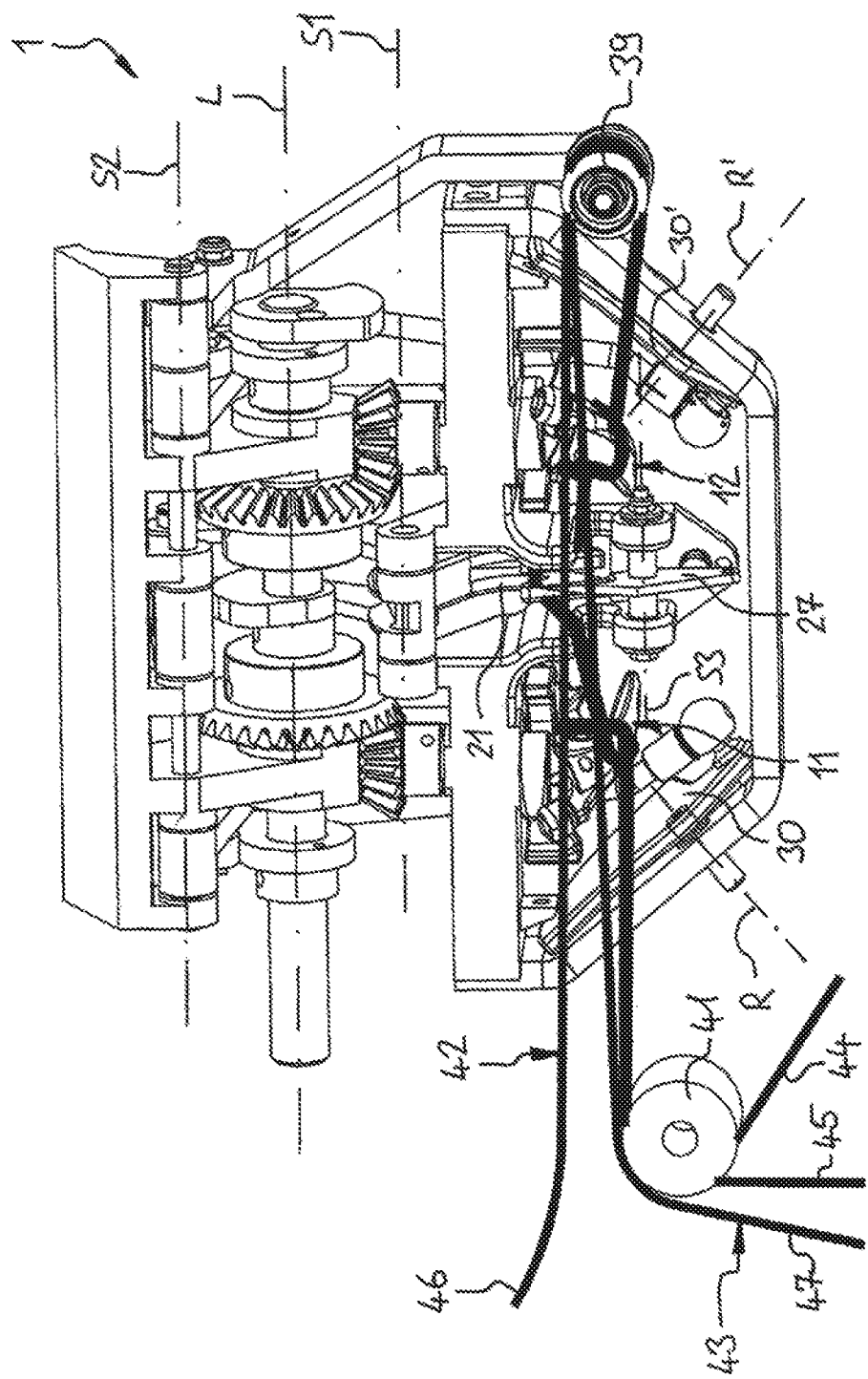
Figure 6:
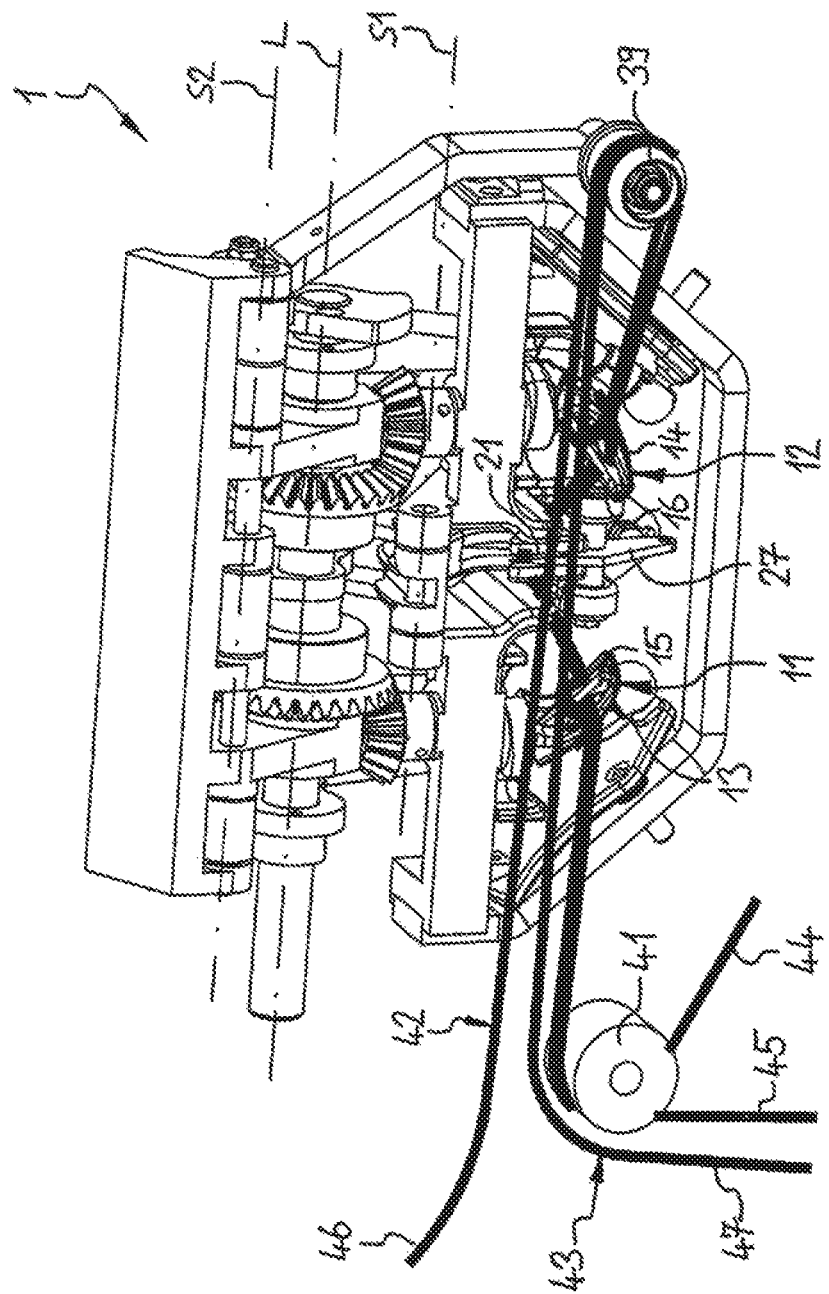

In FIG. 5, the baler needle is again pivoted out of the knotter area. Due to this, the ends 46, 47 of the twine strands 42, 43 leading to the twine roll, have been arranged at the top on the deflection roller 39. The lower twine strand 43 is now also redirected around the twine deflection roller 41. The ends 44, 45 of the two twine strands 42, 43, leading to the bale, run from the twine deflection roller 41 past the twine finger 30, arranged again it its starting position, to the first bill hook 11 and from there to the reserve holder 21 and further to the second bill hook 12 and from there to the deflection roller 39.

The bill hooks 11, 12 have the twine strands 42, 43 wound around them and engage with the now opened bill hook tongues 15, 16 over the respective ends extending to the reserve holder 21. The reserve holder 21 moves in this course of action continuously corresponding to the rotation of the bill hooks 11, 12 back into the forward position and releases thus successively twine reserves, which the bill hooks 11, 12 require, to wind up the twine strands 42, 43.

Figure 7:
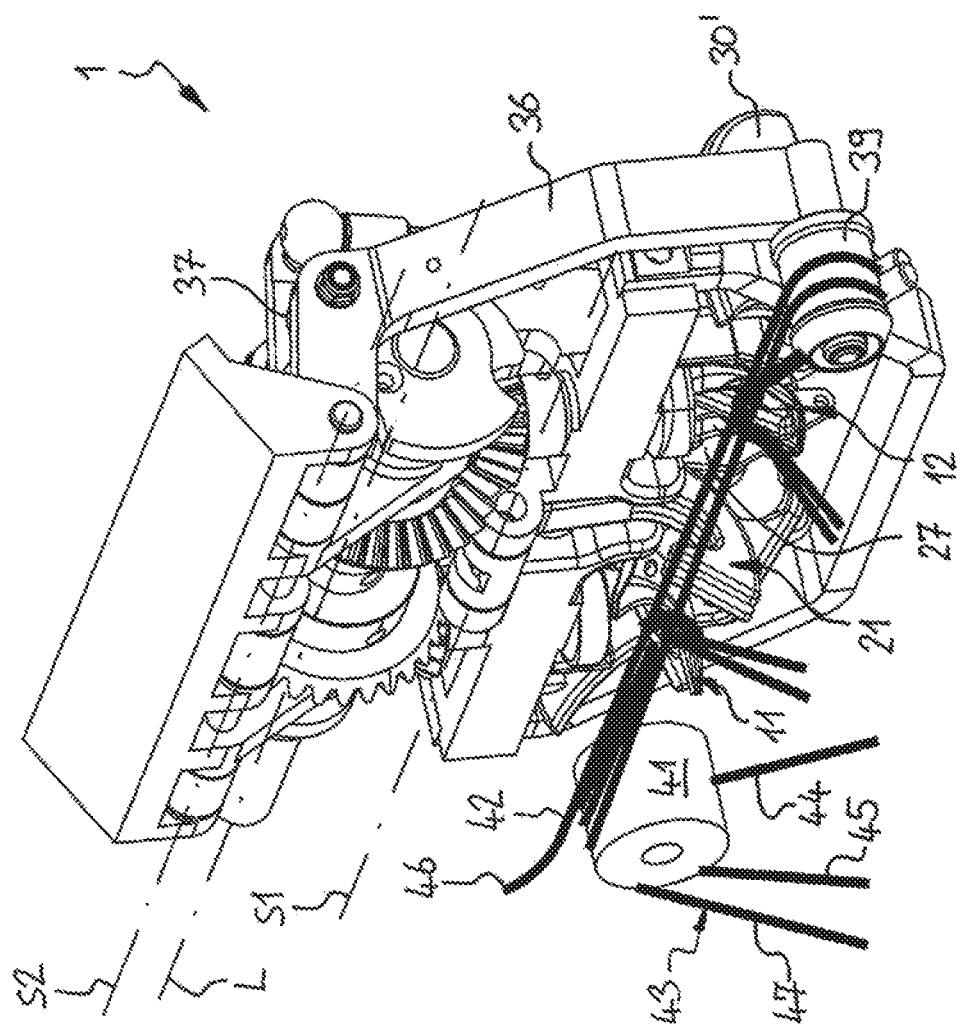

In the next step (FIG. 6) the bill hooks 11, 12 are further rotated, whereby the bill hook tongues 15, 16 are transferred into their closed position. The twine strands 42, 43 are now respectively clamped between the bill hook tongues 15, 16 and the hooked portions 13, 14. The reserve holder 21 is still further pivoted forward, to release more twine reserves, and has moved the twine strands 42, 43 in front of the cutting edge 29 of the knife 27. During the further rotation of the bill hooks 11, 12 also the reserve holder 21 is further pivoted forward. In the course of this, the twine strands 42, 43 are cut by means of the knife 27 (FIG. 7).

Figure 8:
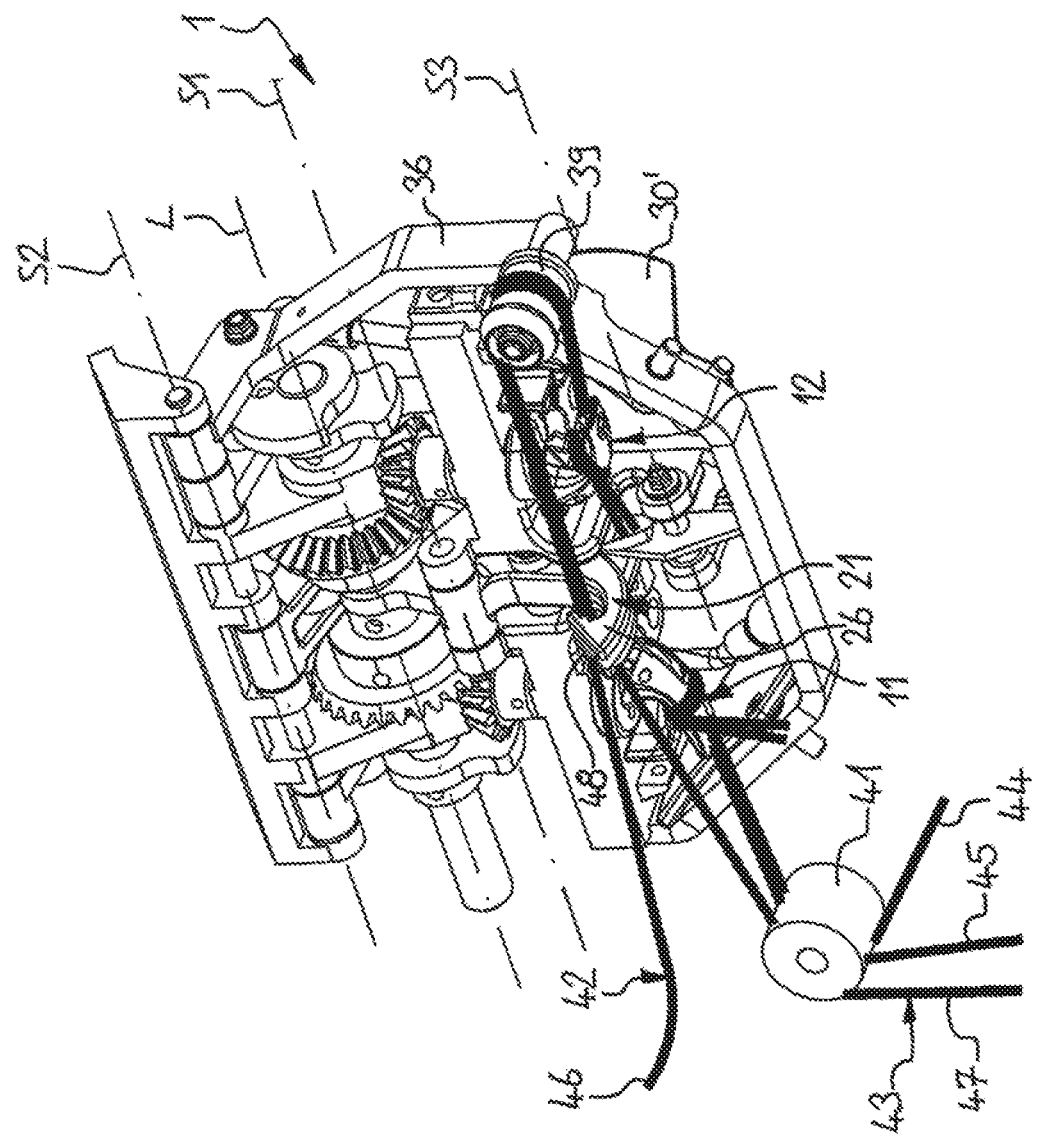

The bill hooks 11, 12 are then further rotated until they have reached their starting position again (FIG. 8). In this position, also the reserve holder 21 has reached its front starting position again. The reserve holder 21 picks up during pivoting into the forward position the ends 46, 47 of the two twine strands 42, 43 leading to the twine roll, which in the right knotter area in FIG. 8 extend via the deflection roller 39 to the second bill hook 12. The twine strands 42, 43 are lifted via front chamfers 48 on the hook portion 26 of the reserve holder 21 when the latter moves forward until they jump into the hook portions 26.

The rotation of the bill hooks 11, 12 is, thus, finished. In the further course of pressing the bales, the finished bales and the starting edge of the new bale are pushed further through the baling channel below the twine knotter 1. This results in a force on the twine strands 42, 43. By means of these forces in the twine strands 42, 43, the knot is pulled off the first bill hook 11 and is formed. The same happens at the second bill hook 12, wherein there the twine strands 42, 43 are deflected around the deflection roller 39, so that the knot can be pulled off the second bill hook 12 even if it is orientated in the opposite direction to the first bill hook 11.

In the following, the binding process is presented by using FIGS. 9 to 16 representing schematically the whole binding device on a bale press using a baler needle with two rollers. For the sake of clarity, known elements for the twine guide, twine tensioning and twine deceleration are omitted in the illustrations.

Figure 9:
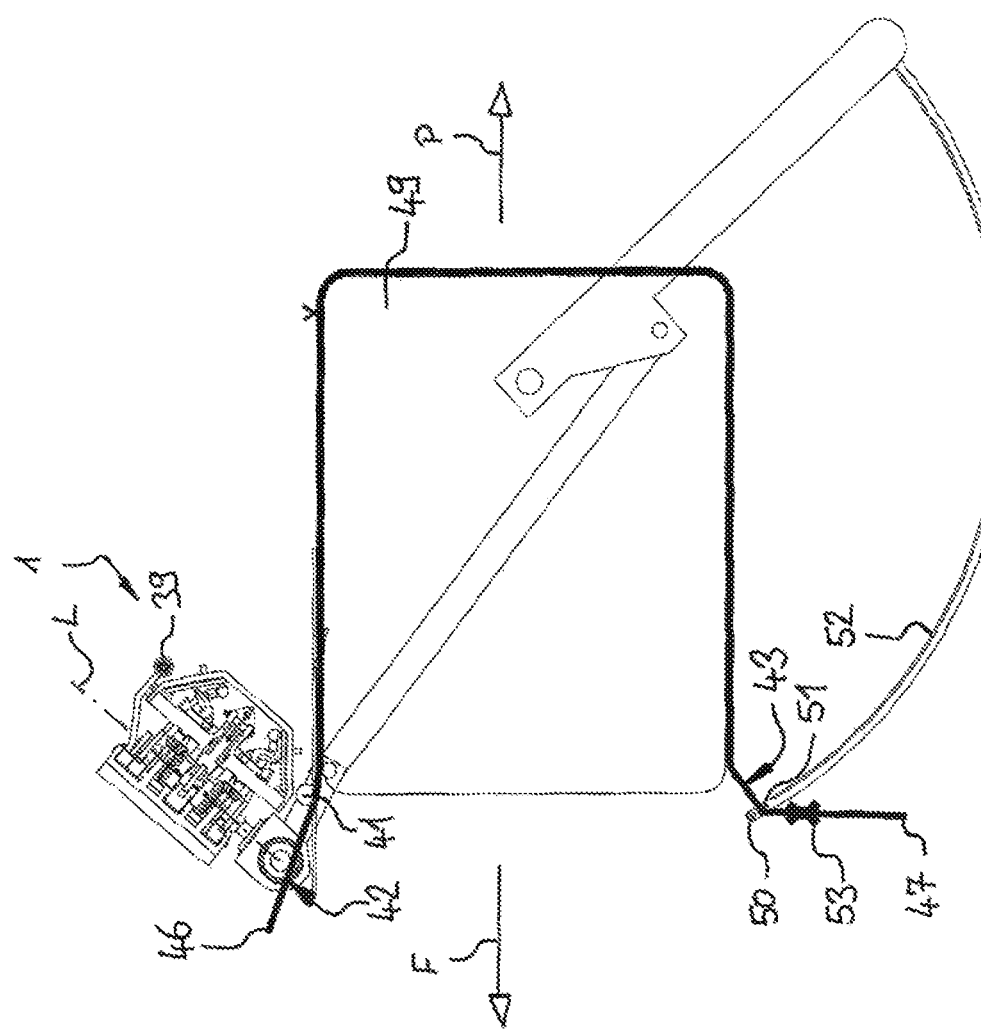
FIGS. 9-16 show a binding device having a twine knotter of FIG. 1 in side view for illustrating the binding process by using a baler needle having two rollers.

FIG. 9 shows the starting position of the binding device. The upper twine strand 42 extends from the (not shown) upper twine roll via the twine deflection roller 41 to the upper side of the bale 49. The bale 49 is pressed and expelled in direction of the arrow P, which indicates the pressing direction. The arrow F indicates the direction of travel of the bale press, to which the terms "front" and "back" refer. Close to a rear edge of the bale 49, the upper twine strand 42 is knotted to a lower twine strand 43. The lower twine strand 43 extends along the rear side of the bale 49 downwards and along the bale lower side forward, where it extends between two rollers 50, 51 of the baler needle 52. From there it extends further through an optionally provided switchable twine clamp 53 via strand guides to a lower twine roll (not shown).

Figure 10:
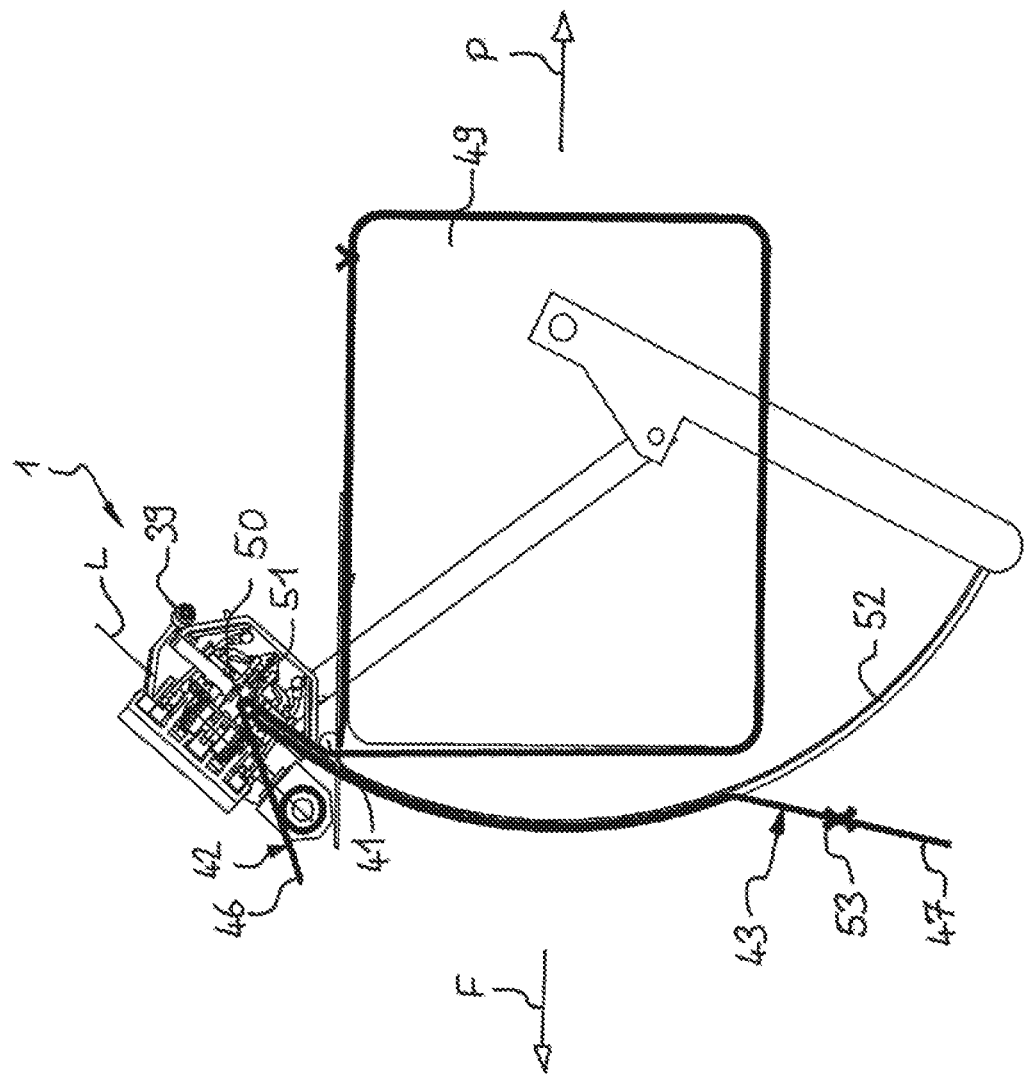

After activating the binding process, as shown in FIG. 10, the baler needle 52 is pivoted through the baler channel, by means of which the bale 49 is pressed, and here not explicitly shown, and has transferred, in this course, the lower twine strand 43 upwards. Above the pressing channel, i.e. above the bale 49, the baler needle 52 engages with its front roller 50 the upper twine strand 42 and moves the two twine strands 42, 43 into the knotter area. The knotter elements, i.e. the twine fingers 30, 30' and the reserve holder 21 are still in their starting position. Only the bill hooks 11, 12 are rotated into a twine take up position.

Figure 11:
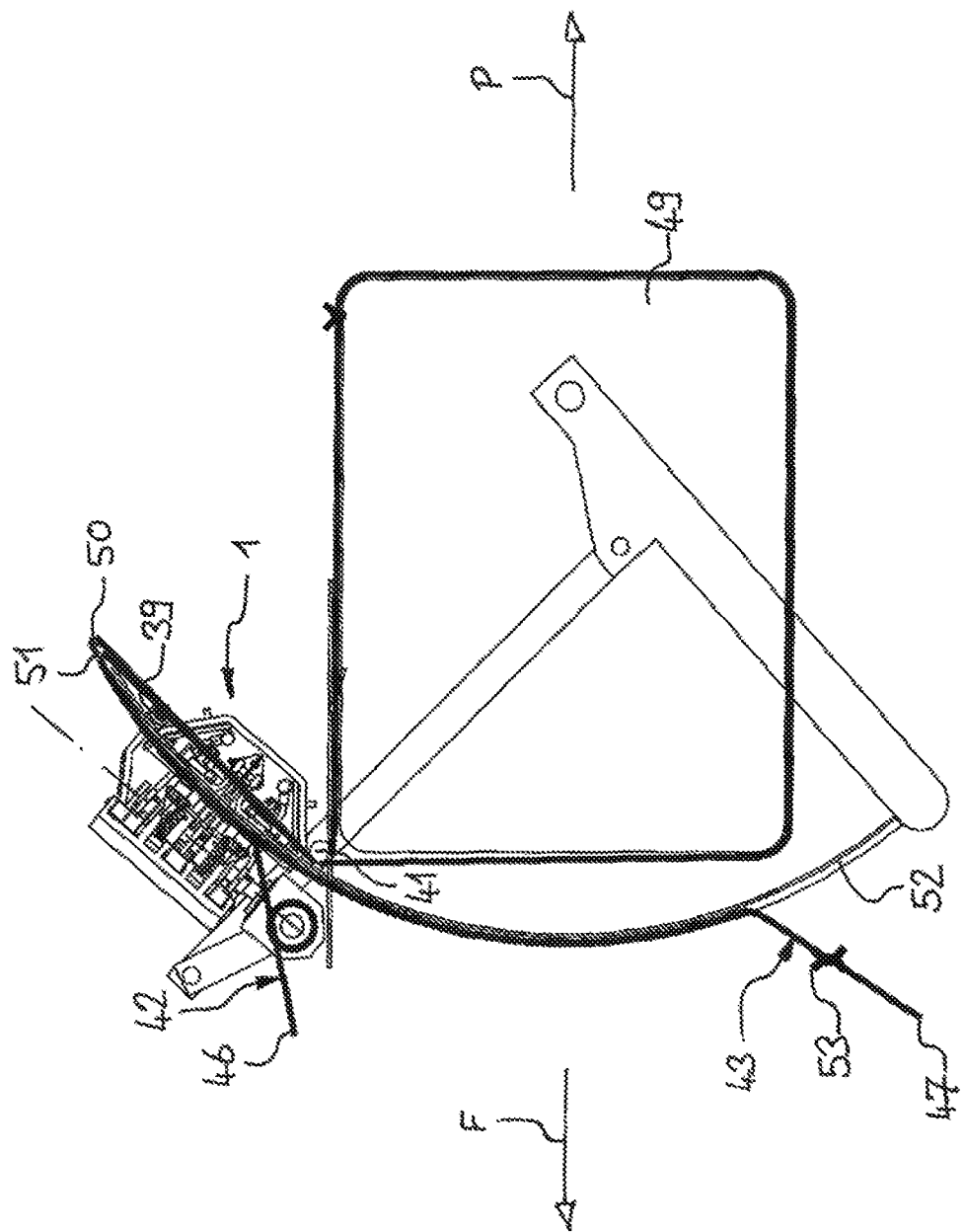

In FIG. 11, the baler needle 52 is nearly in its uppermost position. The position of the twine strands 42, 43 in the knotter area and the positioning of the knotter elements correspond to the representation of FIG. 3.

Figure 12:
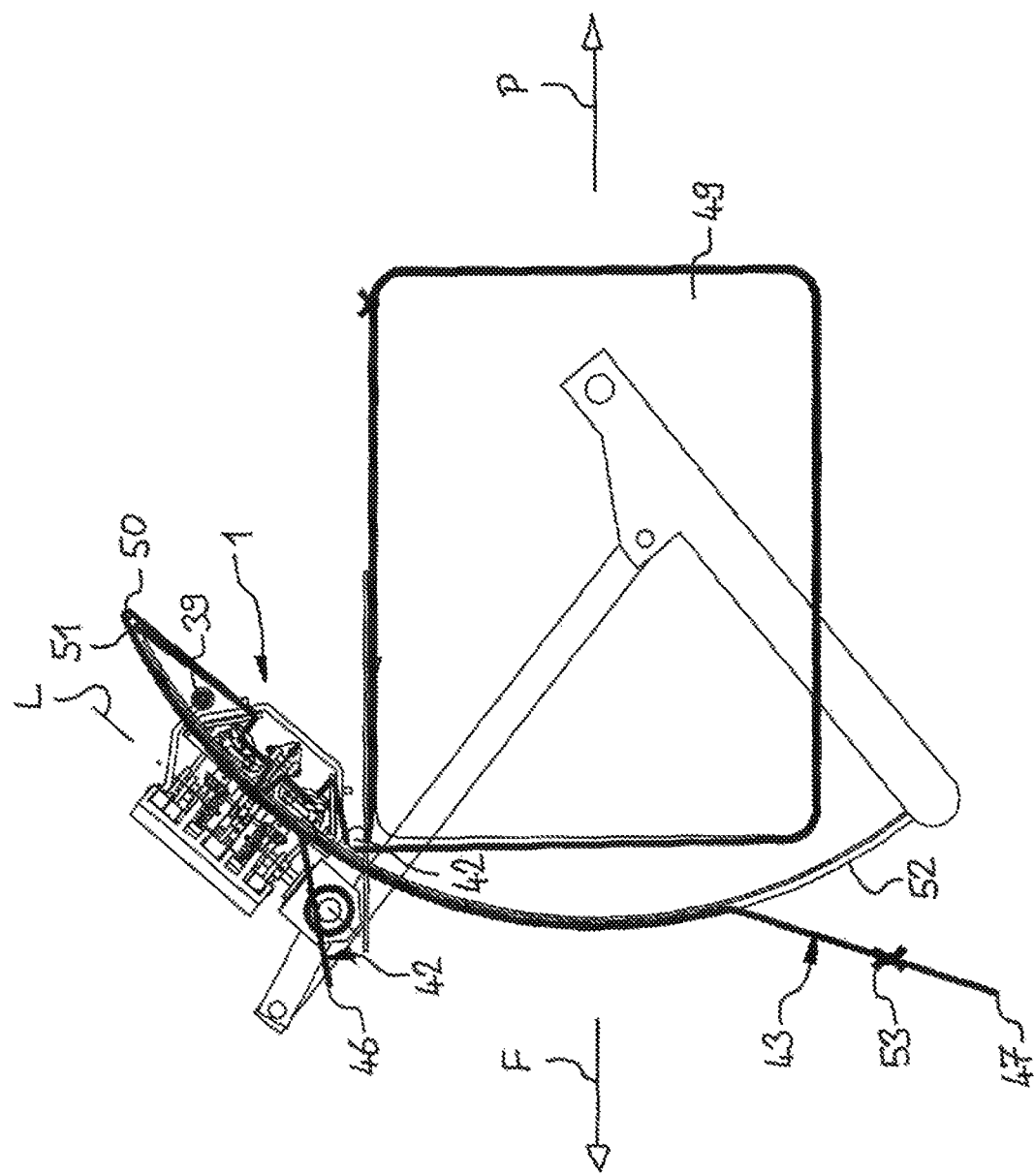

FIG. 12 shows the overall view of the binding device corresponding to the position of FIG. 4.

Figure 13:
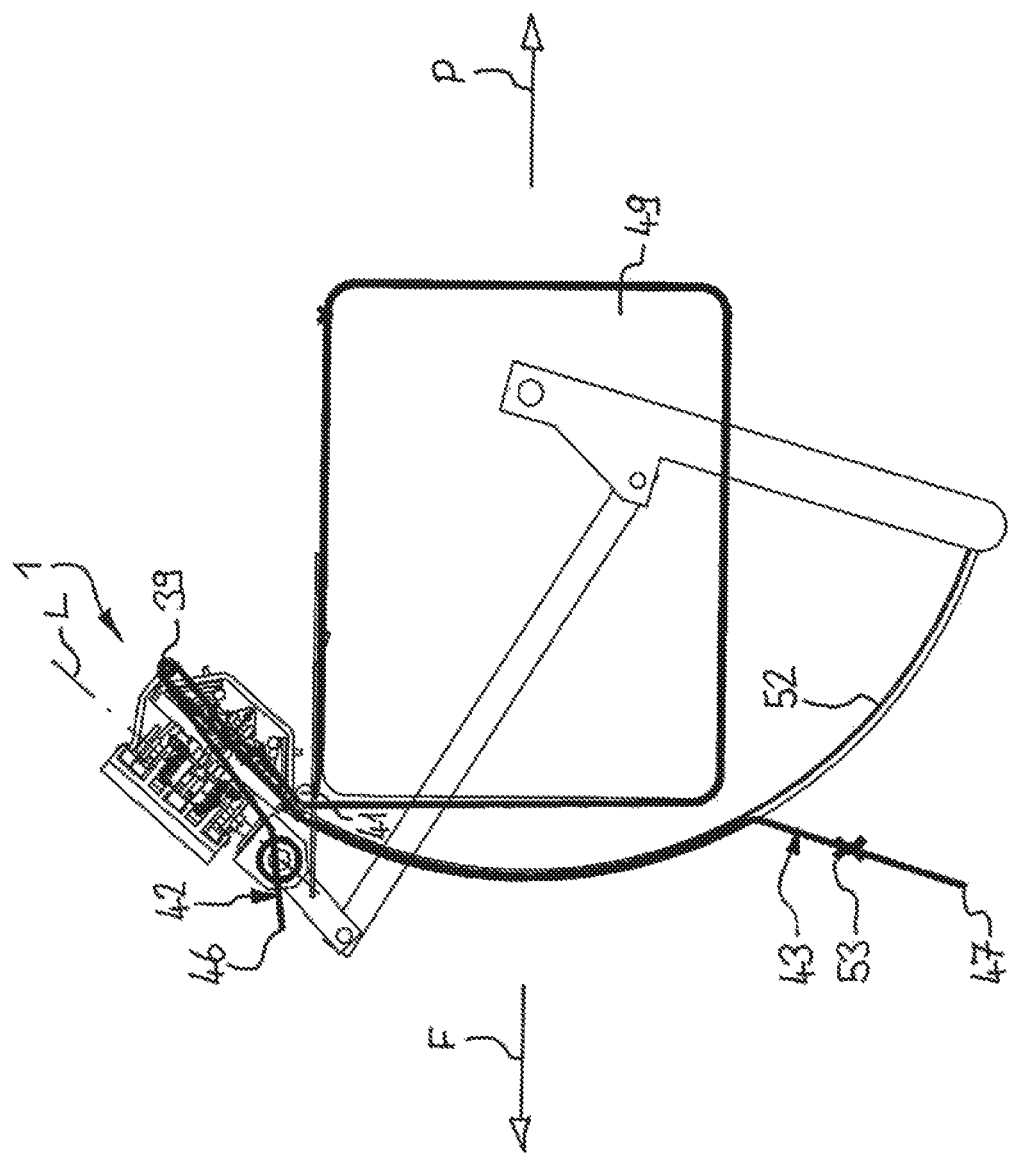

FIG. 13 corresponds in its position to FIG. 5. It can be seen that the baler needle 52 has left the knotter area again, at the same time has released the upper twine strand 42 and has arranged the lower twine strand 43 on the deflection roller 39.

Figure 14:
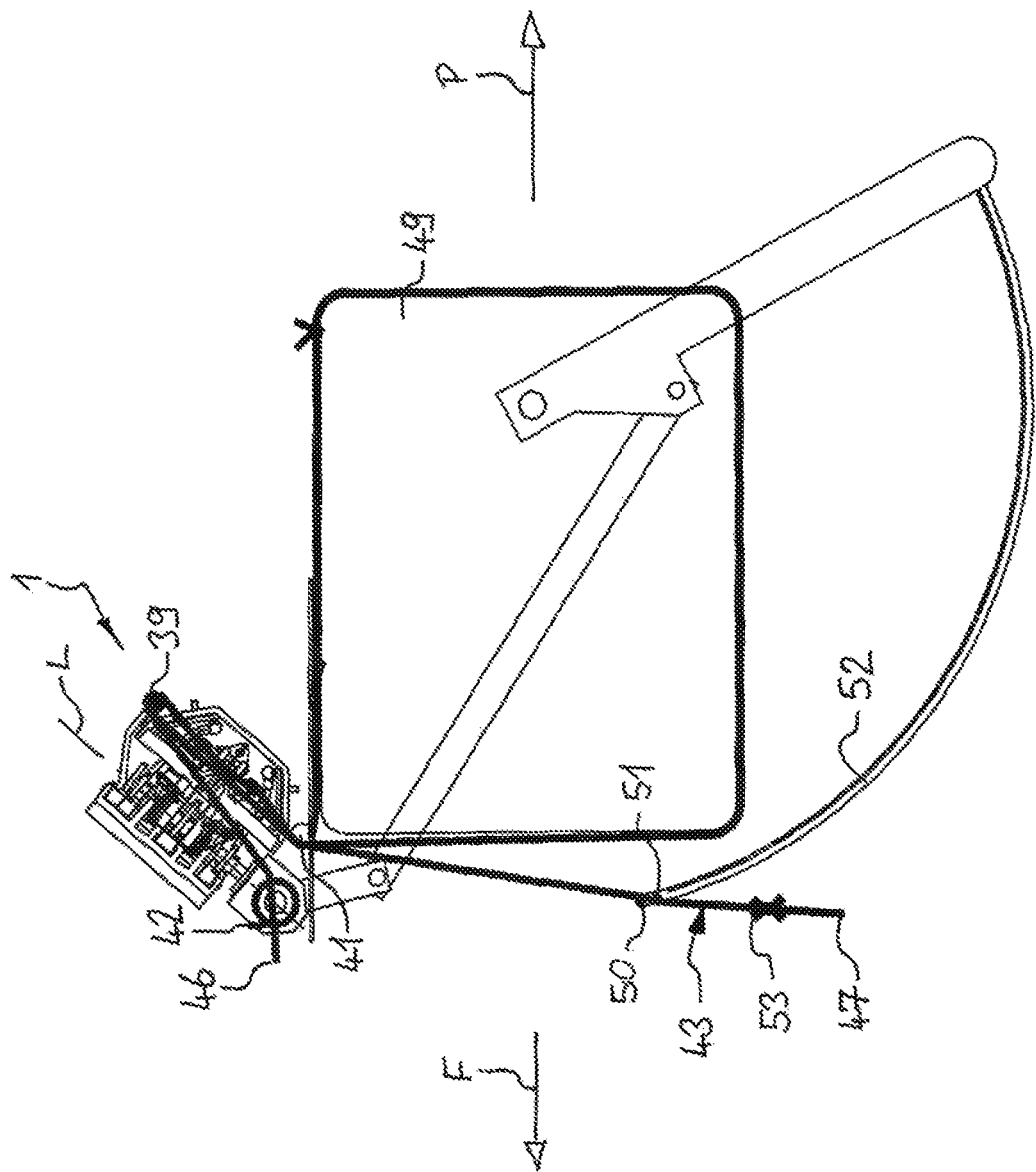

In FIG. 14 the stroke of the baler needle 52 is almost completed. The position of the twine knotter 1 corresponds to that of FIG. 6.

Figure 15:
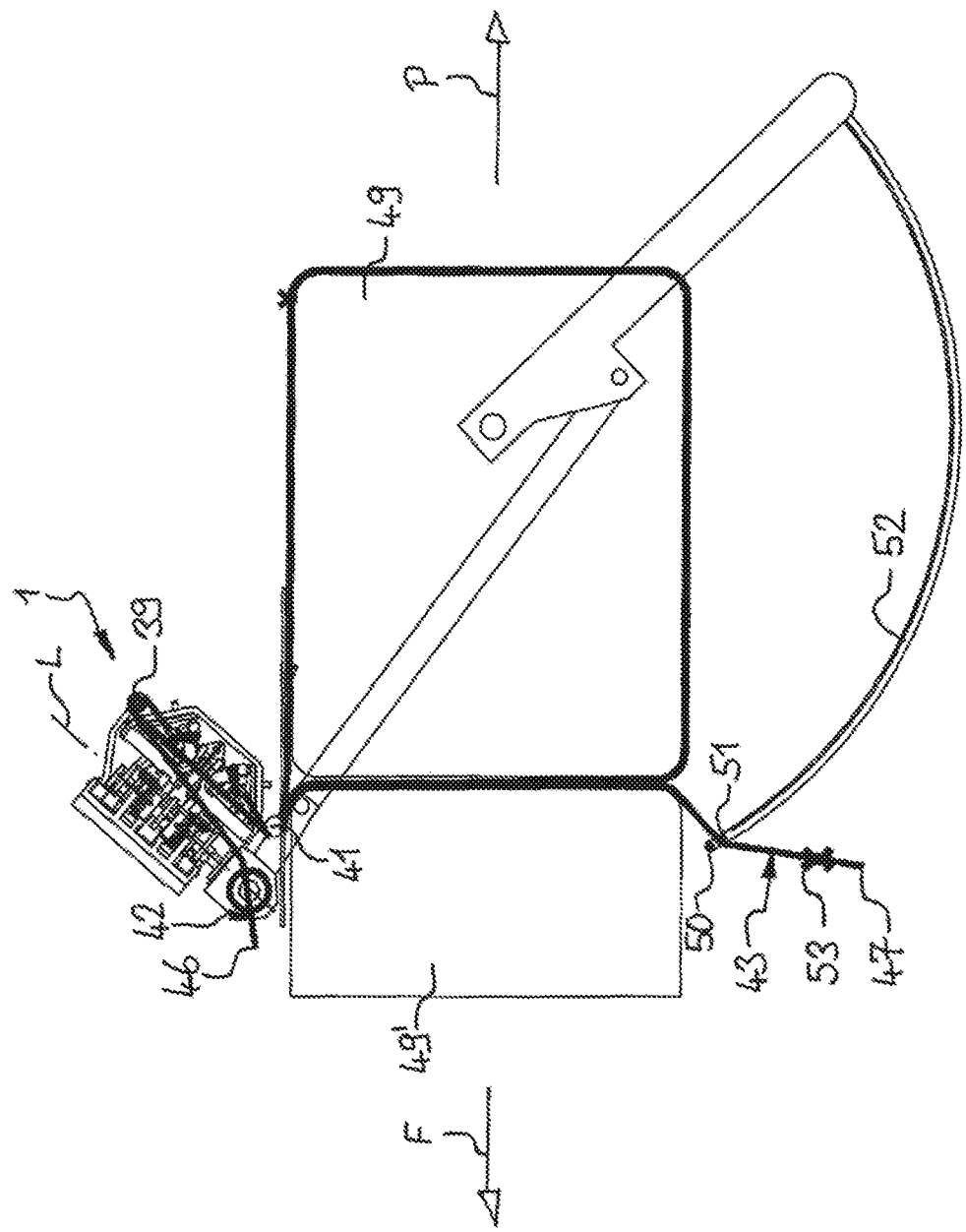

FIG. 15 shows the whole binding device after finishing the binding process. The baler needle 52 is arranged in its starting position again, as well as the bill hooks 11, 12 of the twine knotter 1. The knots are, however, still arranged on the bill hooks 11, 12. The position corresponds to the illustration of FIG. 8.

In the further progress of the pressing process, the twine strands 42, 43 are pressed between the rear finished bale 49 and the new bale 49'. During pushing the bales 49, 49' further forwards, the twine strands 42, 43 pull the knot from the first bill hook 11. By pressing-in the lower twine strand 43 between the two bales 49, 49', the lower twine strand 43 is tensioned during the ongoing pushing of the bales 49, 49' further, wherein this lower twine strand pulls the knot from the second bill hook 12 via the twine deflection roller 41 and the deflection roller 39.

In the event, that the pressing force between the bales 49, 49' is not sufficient, to pull off the second knot from the second bill hook 12, which, for example, can happen during a very loose pressing, the lower twine strand 43 can be blocked with a switchable twine clamp 53 directly after the end of the movement of the baler needle 52. Thus, the whole twine pulling, which is necessary during pushing forward of the bales 49, 49' in the pressing channel, is acting at the upper twine strand 42 and pulls the second knot off. After that, the twine clamp 53 can again be released and both twine strands 42, 43 can be pulled off during the further pressing.

Figure 16:
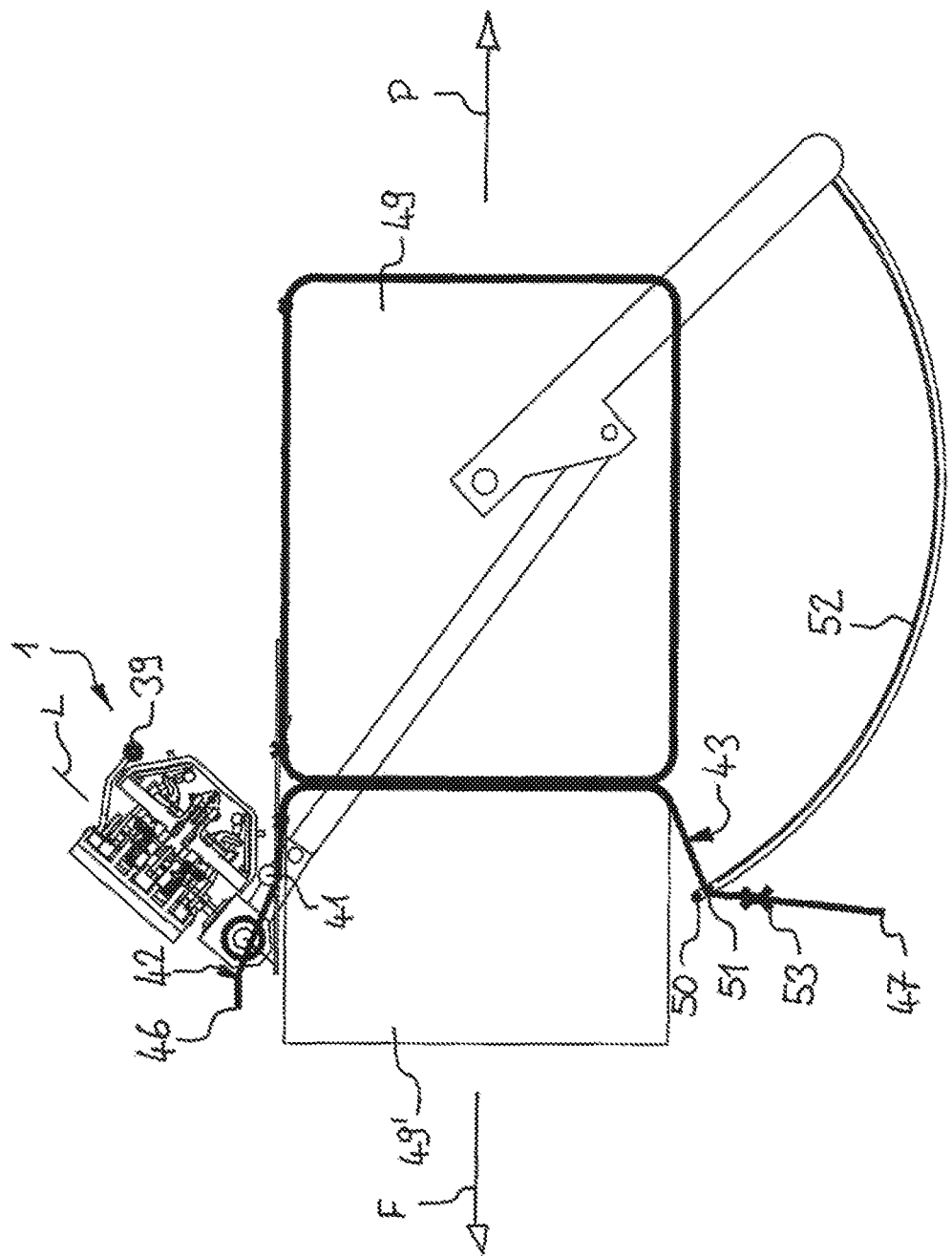

The condition after the pulling-off of the knots is shown in FIG. 16.

The second knot is only pulled off by the lower twine strand 43 from the second bill hook 12, as in the binding process described, the knot is only pulled off by the bale movement in the baling channel and the upper twine strand 42 does not receive any tensile force from this side after the binding process. Thus, it seems necessary, to provide at least a sufficient tensile force by the lower twine strand 43, which is provided independently of the pressing density. A relative simple measure is the switchable twine clamp 53 described above. Alternatively, active devices are conceivable, which act with direct tension onto the upper twine strand 42.

Figures 17, 18:
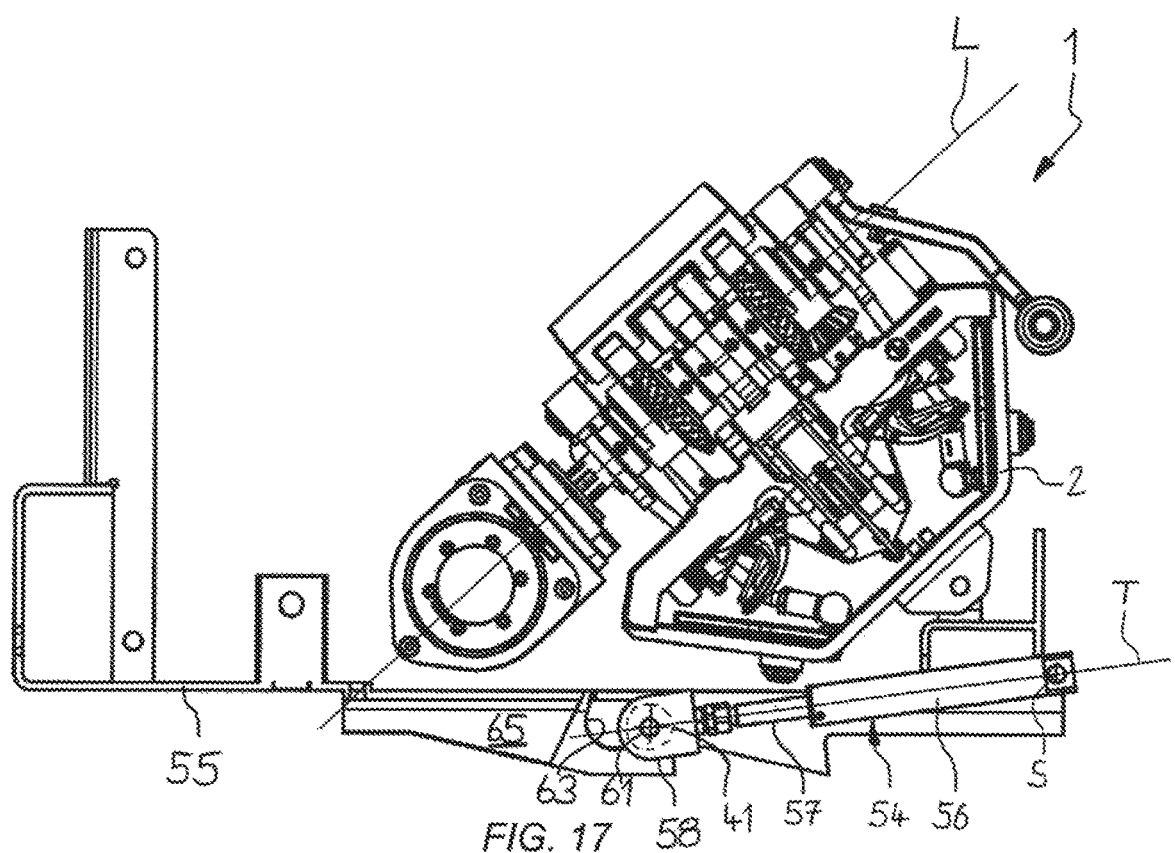
FIG. 17 shows a side view of a twine knotter arrangement according to FIGS. 1 to 16.
FIG. 18 shows an enlarged perspective view of the twine knotter arrangement as shown in FIG. 17 in the area of the deflection roller and FIG. 19 shows a sketch of the force conditions at the deflection roller.

FIG. 17 shows a side view of a twine knotter arrangement according to the invention with a twine knotter 1 according to FIGS. 1 to 16. In principle, however, a different twine knotter can also be used. The illustration is only exemplary in this respect.

The twine knotter 1 is attached with its knotter frame to a frame 55 of the twine knotter arrangement. In the exemplary embodiment shown, several twine knotters 1 are arranged next to each other and connected to the same frame 55. The deflection roller 41 of twine knotter 1 is used to deflect the twine coming from the bale in the direction of twine knotter 1, as shown for example in FIG. 3. The deflection roller 41 is connected via a roller holder 58 to a length-adjustable adjusting device 54. The adjusting device 54 is mounted on frame 55 so that it can be pivoted about a pivot axis S. The adjusting device 54 is designed in the form of a telescopic rod and for this purpose has a cylinder tube 56 and a cylinder rod 57 guided therein along a telescopic axis T. At an end facing away from the cylinder tube 56, the cylinder rod 57 carries a roller holder 58. The roller holder 58 is U-shaped and holds the deflection roller 41 between two fork arms 59, 60. The roller holder 58 is provided with guide pins 61 which protrude outwards, only one of which is visible in the figures. The guide pins 61 project in opposite directions from the roller holder 58 and are each connected to one of the fork arms 59, 60.

The guide pins 61 are each guided in a guide groove 62, 63 of frame 55 so that they can move in translation. The guide grooves 62, 63 are each arranged in a guide wall 64, 65 of frame 55. In the example shown, frame 55 is made of sheet metal material, with guide walls 64, 65 formed from the sheet metal material.

The guide grooves 62, 63 are aligned substantially parallel to the pressing direction, with the telescopic axis T forming an angle with the guide grooves 62, 63. Accordingly, when the roller holder 58 is moved along the guide grooves 62, 63, a pivoting movement of the adjusting device 54 about the pivot axis S results.

The adjusting device 54 may be in the form of a compression spring element or a gas pressure spring, whereby the cylinder rod 57 is subjected to force in the direction of an extended position relative to the cylinder tube 56. A tensile force within the twine creates a radial force from the twine to the deflection roller 41, so that the adjusting device 54 is retracted against the force acting on the cylinder stand 57 in the direction of the extended position. In this case, spring means in the adjusting device 54 can be pre-tensioned in such a way that the adjusting device 54 does not collapse before a predetermined limit force is reached.

Figure 19:
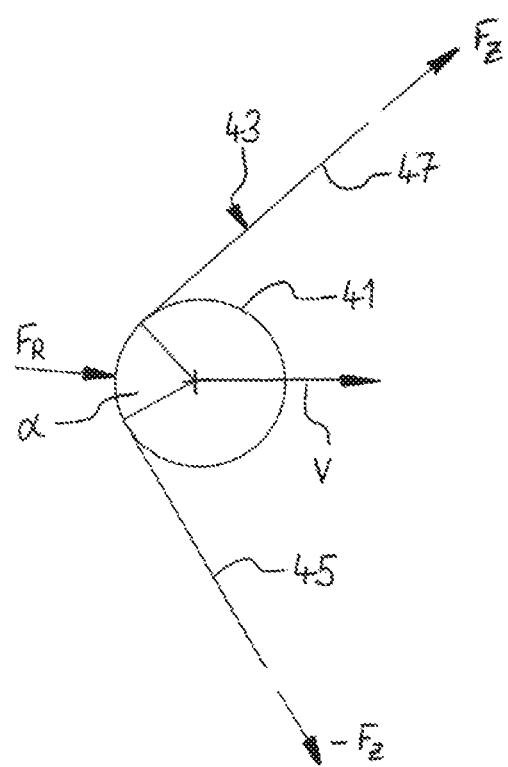

FIG. 19 shows schematically the force conditions at the deflection roller 41 during a twine wrap as shown in FIG. 3. For the sake of simplicity, only the lower twine strand 43 is shown, i.e. the end 45 of the lower twine strand 43 leading to the bale and the end 47 of the lower twine strand 43 leading to the twine roll.

The lower twine strand 43 is wound around the deflection roller 41 via a wrap angle $\alpha$. The tensile forces $F_K$ present in the lower twine strand 43 result in a radial force $F_R$ being exerted on the deflection roller 41 by the lower twine strand 43. This radial force $F_R$ is opposite to the force with which the adjusting device 54 (FIG. 17) is loaded to the extended position, whereby the deflection roller 41 is displaced in an adjustment direction V, which is predetermined by the guide grooves 62, 63 (FIG. 18), at least when a limit tensile force is exceeded. This shifting reduces the tensile force $F_Z$ in the lower twine strand 43, so that a yield point of the twine material is not exceeded and thus tearing of the twine strand is avoided.

Similar conditions are obtained when looking at the upper twine strand 42, whereby the radial force on the deflection roller 41 resulting from the tensile force in the upper twine strand 42 is added to the radial force $F_R$ resulting from the tensile force $F_Z$ of the lower twine strand 43.

LIST OF REFERENCE SIGNS

1 Twine knotter
2 Knotter frame
3 Intermediate shaft
4 Shaft input
5 First input-bevel-gear
6 Second input-bevel-gear
7 First output-bevel-gear
8 Second output-bevel-gear
9 First bill hook shaft
10 Second bill hook shaft
11 First bill hook
12 Second bill hook
13 First hooked portion
14 Second hooked portion
15 First bill hook tongue
16 Second bill hook tongue
17 First bill hook control cam
18 Second bill hook control cam
19 First bill hook tongue roller
20 Second bill hook tongue roller
21 Reserve holder
22 Lever
23 Roller
24 Control cam
25 Coupling rod
26 Hook portion
27 Knife 28 Knife back
29 Cutting edge
30, 30' Twine finger
31, 31' Lever
32 Roller
33 Control cam
34 Coupling rod
35 Deflecting device
36 Pivot arm
37 Roller
38 Control cam
39 Deflection roller
40 Bracket
41 Deflection roller
42 Upper twine strand
43 Lower twine strand
44 End of the upper twine strand leading to the bale
45 End of the lower twine strand leading to the bale
46 End of the upper twine strand leading to the twine roll
47 End of the lower twine strand leading to the twine roll
48 Chamfer
49, 49' Bale
50 Roller
51, 51' Roller
52, 52' Baler needle
53 Twine clamp
54 Adjusting device
55 Frame
56 Cylinder tube
57 Cylinder rod
58 Roller holder
59 Fork arm
60 Fork arm
61 Guide pin
62 Guide groove
63 Guide groove
64 Guide wall
65 Guide wall
F Direction of travel
$F_R$ Radial force
$F_Z$ Tensile force in twine
K1 First bill hook axis
K2 Second bill hook axis
L Longitudinal axis
P Pressing direction
R, R' Twine finger axis
First pivot axis
S2 Second pivot axis
S3 Third pivot axis
S Pivot axis
T Telescopic axis
V Adjustment direction
α Wrap angle

The invention claimed is:

1. A twine knotter arrangement for knotting twine to tie a bale, the twine knotter arrangement comprising:
a twine knotter,
a deflection roller adjustable relative to the twine knotter, via which twine coming from the bale is deflected in a direction of the twine knotter, and
an adjusting device for adjusting a position of the deflection roller in dependence on the force exerted by the twine on the deflection roller, wherein
the twine knotter arrangement has a frame on which the deflection roller is guided in a translatable manner,
the adjusting device is on the one hand hinged to the frame and on the other hand supported against the deflection roller, and
the adjusting device is adjustable in length.

2. The twine knotter arrangement according to claim 1, wherein
the adjusting device can be adjusted via a spring element, hydraulically or pneumatically.

3. The twine knotter arrangement according to claim 1, wherein
the deflection roller is fixed to a roller holder which is connected to the adjusting device.

4. The twine knotter arrangement according to claim 3, wherein
the roller holder has laterally projecting guide pins, which are guided in guide grooves of the frame.

5. The twine knotter arrangement according to claim 1, wherein
the adjusting device has a telescopic rod, which is force-loaded in order to assume an extended position.

6. The twine knotter arrangement according to claim 5, wherein
the telescopic rod is spring-loaded to assume the extended position.

7. The twine knotter arrangement according to claim 1, wherein
the twine knotter has the following:
a knotter frame,
an intermediate shaft, which is rotatably supported on the knotter frame around a longitudinal axis and which has a shaft input for connecting the intermediate shaft to an output element of a knotter drive shaft, and
at least one bill hook shaft, which is rotatably supported around a bill hook axis on the knotter frame, which is drive-wise connected to the intermediate shaft and which carries a bill hook for forming a knot.

8. The twine knotter arrangement according to claim 7, wherein
the twine knotter is formed as an independent unit, wherein the twine knotter is drive-wise detachably connectible via the shaft input of the intermediate shaft to the knotter drive shaft.

9. The twine knotter arrangement according to claim 1, wherein
two bill hook shafts are provided, each of which is rotatably supported around a bill hook axis on a knotter frame and which are drive-wise connected to an intermediate shaft.

10. The twine knotter arrangement according to claim 1, wherein
a deflection device is provided for redirecting twine strands, which is held movably on a knotter frame and which is driven by an intermediate shaft.

11. A twine knotter arrangement for knotting twine to tie a bale, the twine knotter arrangement comprising:
a twine knotter,
a deflection roller adjustable relative to the twine knotter, via which twine coming from the bale is deflected in a direction of the twine knotter, and
an adjusting device for adjusting a position of the deflection roller in dependence on the force exerted by the twine on the deflection roller, wherein
the adjusting device has a telescopic rod, which is force-loaded in order to assume an extended position, and the telescopic rod is spring-loaded to assume the extended position.

\* \* \* \* \*